(12) United States Patent
Abe

(10) Patent No.: US 8,928,481 B2
(45) Date of Patent: Jan. 6, 2015

(54) ARTICLE STORAGE EQUIPMENT AND METHOD OF OPERATING SAME

(75) Inventor: Takeshi Abe, Higashiomi (JP)

(73) Assignee: Daifuku Co., Ltd., Osaka (JP)

( * ) Notice: Subject to any disclaimer, the term of this patent is extended or adjusted under 35 U.S.C. 154(b) by 391 days.

(21) Appl. No.: 13/513,772

(22) PCT Filed: Nov. 8, 2010

(86) PCT No.: PCT/JP2010/069850
§ 371 (c)(1),
(2), (4) Date: Aug. 9, 2012

(87) PCT Pub. No.: WO2011/070881
PCT Pub. Date: Jun. 16, 2011

(65) Prior Publication Data
US 2012/0306626 A1      Dec. 6, 2012

(30) Foreign Application Priority Data

Dec. 7, 2009  (JP) ................................ 2009-277733

(51) Int. Cl.
*G08B 13/14*     (2006.01)
*B65G 1/04*      (2006.01)

(52) U.S. Cl.
CPC ............ *B65G 1/0421* (2013.01); *B65G 1/0435* (2013.01)
USPC ........................... 340/572.1; 235/383; 705/28

(58) Field of Classification Search
CPC ............................. B65G 1/0435; B65G 1/0421
See application file for complete search history.

(56) References Cited

U.S. PATENT DOCUMENTS

| 7,829,028 B2* | 11/2010 | Elsener et al. ................. 422/536 |
| 2007/0205126 A1* | 9/2007 | Elsener et al. ................. 206/456 |
| 2007/0296585 A1* | 12/2007 | Ishida et al. ................ 340/572.1 |
| 2008/0213080 A1* | 9/2008 | Cachelin et al. ........... 414/791.6 |
| 2008/0272138 A1* | 11/2008 | Ross et al. ......................... 221/1 |
| 2008/0281717 A1* | 11/2008 | Kortelainen .................... 705/26 |
| 2009/0108017 A1* | 4/2009 | Schifman et al. ............. 221/133 |
| 2009/0292394 A1* | 11/2009 | Hyung et al. .................. 700/251 |
| 2009/0297328 A1* | 12/2009 | Slocum, III .................... 414/806 |
| 2010/0247275 A1* | 9/2010 | Karlen et al. ................. 414/286 |

(Continued)

FOREIGN PATENT DOCUMENTS

| JP | 57156906 A | 9/1982 |
| JP | 63212606 A | 9/1988 |

(Continued)

*Primary Examiner* — Hai Phan
*Assistant Examiner* — Ojiako Nwugo
(74) *Attorney, Agent, or Firm* — The Webb Law Firm

(57) ABSTRACT

Article storage equipment includes a passive-type RFID tag storing identification information of an article storage container and provided in a portion of an outer periphery of the article storage container overlapping above a plate-like member with the article storage container being placed on a storage unit, and control means configured to perform a reading-out operation process for controlling operation of conveying means when execution of an article confirmation process for allowing a RFID reader to read out the identification information of the RFID tag provided in the article storage container stored in the storage unit is instructed to extend an article supporting member to a projecting position at a fetching level, raise the article supporting member to a target reading-out level higher than the fetching level by a raised amount for reading, and then lower the article supporting member to the fetching level to be withdrawn to a retracted position.

14 Claims, 10 Drawing Sheets

(56) References Cited

U.S. PATENT DOCUMENTS

| | | | |
|---|---|---|---|
| 2010/0268380 A1* | 10/2010 | Waugh et al. | 700/239 |
| 2012/0143726 A1* | 6/2012 | Chirnomas | 705/27.1 |
| 2013/0011226 A1* | 1/2013 | Camenisch et al. | 414/277 |

FOREIGN PATENT DOCUMENTS

| | | |
|---|---|---|
| JP | 4173699 A | 6/1992 |
| JP | 5105204 A | 4/1993 |
| JP | 2002231785 A | 8/2002 |
| JP | 2004315191 A | 11/2004 |
| JP | 200649454 A | 2/2006 |
| JP | 2006199450 A | 8/2006 |
| JP | 2009263035 A | 11/2009 |
| TW | 200946423 A1 | 11/2009 |
| WO | 2006059675 A1 | 6/2006 |

* cited by examiner

ARTICLE STORAGE EQUIPMENT AND METHOD OF OPERATING SAME

TECHNICAL FIELD

The present invention relates to article storage equipment comprising a storage section including a plurality of arranged storage units each for supporting and receiving an article storage container; conveying means movable in a direction of arranging the storage units within an article transporting space defined in a front side of the storage section and having transfer means operable to transfer the article storage container to the storage units; and control means for controlling operation of the conveying means, and a method of operating the equipment.

BACKGROUND ART

In an example of the above-noted article storage equipment, the transfer means is configured to perform a fetching process, with an article supporting member movable between a retracted position in the article transporting space and a projecting position to extend into each of the storage units and also vertically movable, for taking out the article storage container placed on the storage unit and a storing process for storing the article storage container placed on the article supporting member in the storage unit, and each of the storage units is formed of a plate-like member for receiving the container made of metal and having an opening through which the article supporting member in the projecting position vertically passes. The control means is configured to control the operation of the conveying means in performing the fetching process to extend the article supporting member to the projecting position at a fetching level lower than the plate-like member by a fixed amount, raise the article supporting member to a target fetching level higher than the fetching level by a raised amount for fetching, and then withdraw the article supporting member into the retracted position.

The above-noted article storage equipment is designed to allow the transfer means provided in the conveying means to move within the article transporting space defined in the front side of the storage section along the direction of arranging the storage units to the target storage unit and to allow the article supporting member forming the transfer means to perform the fetching process for taking out the article storage container stored in the target storage unit or the storing process for storing the article storage container in the storage unit. As the article storage container, various types of containers for storing the article including a bucket or an FOUP (Front Opening Unified Pod) for storing a substrate may be used.

The article storage container fetched in the fetching process is generally transported to an article access portion provided in the storage section, but sometimes transported to another storage unit. Similarly, the article storage container stored in the storage unit in the storing process is generally transported from the article access portion provided in the storage section, but sometimes fetched from another storage unit.

When the fetching process is performed with the article supporting member, the control means allows the article supporting member to extend to the projecting position to project into the storage unit at the fetching level lower than the plate-like member for receiving the container by the fixed amount. Next, the control means raises the article supporting member to the target fetching level higher than the fetching level by the raised amount for fetching. Then, the control means controls the operation of the conveying means to withdraw the article support member into the retracted position. The fetching level is determined to be a level where the article supporting member extended to the projecting position does not come into contact with the plate-like member forming the storage unit. The target fetching level is determined to be a level where the article supporting member withdrawn into the retracted position does not come into contact with the plate-like member forming the storage unit.

In this type of article storage equipment, it is required to perform an article confirmation process (stocktaking process, in other words) for confirming the presence of the article storage container stored in the storage unit. To this end, the equipment may be provided with a tag having identification information of the article storage container in the article storage container to perform the article confirmation process by reading out the identification information of the tag.

A conventional example for performing such an article confirmation process is disclosed in Japanese Unexamined Patent Application Publication No. 5-105204 in which article storage equipment includes a stacker crane acting as conveying means. In this equipment, a barcode label acting as a tag having identification information is attached to an article storage container, while a barcode reader acting as a reader for reading out the identification information of the tag is provided in a lift deck having a fork acting as an article supporting member. When execution of the article confirmation process is instructed, control means for controlling operation of the conveying means takes out the article storage container stored in a target storage unit to the lift deck in the fetching process, allows the barcode reader to read out the barcode label attached to the article storage container, and then stores the article storage container in the storage unit in the storing process.

Another conventional example is disclosed in International Publication No. WO 2006/059675 in which article storage equipment includes a stacker crane acting as conveying means. In this equipment, an RFID (Radio Frequency Identification) tag acting as a tag having identification information is attached to an article storage container, while an RFID reader acting as a reader for reading out the identification information of the tag is provided in a lift deck. When execution of the article confirmation process is instructed, control means for controlling operation of the conveying means takes out the article storage container stored in a target storage unit to the lift deck, allows the RFID reader to read out the RFID tag attached to the article storage container, and then stores the article storage container in the storage unit in the storing process.

It should be noted that the barcode label acting as the tag having the identification information is easily defaced. Further, it is required to precisely place the barcode label and the barcode reader in positions suitable for reading in order to have the barcode reader read out the barcode label. As a result, when the barcode label and the barcode reader are used, the article confirmation process may be performed less satisfactorily due to illegibility.

In contrast, when the RFID reader and the RFID tag are used, the RFID tag having the identification information does not become illegible due to defacement. Further, the RFID reader can read out the RFID tag even if the positional relationship between the RFID reader and the RFID tag is somewhat changed, as a result of which the article confirmation process may be performed satisfactorily.

Patent Document 1: Japanese Unexamined Patent Application Publication No. 5-105204
Patent Document 2: International Publication No. WO 2006/059675

DISCLOSURE OF INVENTION

When the article storage container stored in the storage unit in the conventional article storage equipment is confirmed, it is required to take out the article storage container stored in the storage unit to the lift deck to confirm the article, and then store the article storage container that has been taken out in the storage unit. More particularly, since the article storage container has to be temporarily taken out to the lift deck, the time required for the article confirmation process is disadvantageously prolonged. It should be noted that, in such an article confirmation process, the transfer means is usually moved to each of the plurality of the storage units to confirm the presence of the article storage containers stored in all the storage units. Thus, a huge amount of time is required to perform the article confirmation process in all the shortage units.

The present invention has been made having regard to the above-noted disadvantage, and its object is to provide article storage equipment and a method of operating the same for performing an article confirmation process appropriately and cut down the time required for such a process at the same time.

In order to achieve the above-noted object, a characteristic feature of article storage equipment according to the present invention lies in comprising a storage section including a plurality of arranged storage units each for supporting and receiving an article storage container; conveying means movable in a direction of arranging the storage units within an article transporting space defined in a front side of the storage section and having transfer means operable to transfer the article storage container to the storage units; and control means for controlling operation of the conveying means, the transfer means having an article supporting member movable between a retracted position in the article transporting space and a projecting position to project into each of the storage units and also vertically movable for receiving the article storage container, the article supporting member being used in a fetching process for taking out the article storage container placed on any of the storage units and in a storing process for storing the article storage container placed on the article supporting member in any of the storage units;

the storage units each having a plate-like member made of metal for receiving the article storage container to be stored, the plate-like member having an opening through which the article supporting member in the projecting position vertically passes, the control means being configured to control the operation of the conveying means to extend the article supporting member to the projecting position at a fetching level lower than the plate-like member of the storage unit by a fixed amount, raise the article supporting member to a target fetching level higher than the fetching level by a raised amount for fetching, and then withdraw the article supporting member to the retracted position when the fetching process is performed, wherein the article storage container has a passive-type RFID tag storing identification information of the article storage container and provided in a portion of an outer periphery of the article storage container overlapping above the plate-like member with the article storage container being placed on the storage unit, the article supporting member has an RFID reader for reading out the identification information stored in the RFID tag, and the control means is configured to perform a reading-out operation process for controlling the operation of the conveying means when execution of an article confirmation process for allowing the RFID reader to read out the identification information of the RFID tag provided in the article storage container stored in the storage unit is instructed to extend the article supporting member to the projecting position at the fetching level, raise the article supporting member to a target reading-out level higher than the fetching level by a raised amount for reading, and then lower the article supporting member to the fetching level to be withdrawn to the retracted position.

That is to say, the passive-type RFID tag storing the identification information of the article storage container is provided in the portion of the outer periphery of the article storage container overlapping above the plate-like member with the article storage container being placed on the storage unit, while the RFID reader for reading out the identification information stored in the RFID tag is provided in the article supporting member.

When the RFID reader reads out the identification information stored in the passive-type RFID tag provided in the article storage container stored in the storage unit, the article supporting member is allowed to project into the storage unit and rise.

More particularly, when the execution of the article confirmation process for allowing the RFID reader to read out the identification information of the RFID tag provided in the article storage container stored in the storage unit is instructed, the control means is configured to perform the reading-out operation process for controlling the operation of the conveying means to extend the article supporting member to the projecting position at the fetching level, raise the article supporting member to a target reading-out level higher than the fetching level by the raised amount for reading, and then lower the article supporting member to the fetching level to be withdrawn to the retracted position. During that time, the RFID reader provided in the article supporting member reads out the identification information stored in the RFID tag provided in the article storage container.

When the article confirmation process is performed in this way, the article supporting member is allowed to extend to the projecting position at the fetching level, to be raised to the target reading-out level higher than the fetching level by the raised amount for reading, and then to be lowered to the fetching level to be withdrawn into the retracted position. Thus, the article confirmation process may be performed with the article storage container being positioned in the storage unit, without requiring much effort of taking out the article storage container stored in the storage unit of the storage unit and then storing the container in the storage unit again, which may reduce the time required for the article confirmation process.

Further, when the identification information stored in the RFID tag provided in the article storage container is read out by the RFID reader provided in the article supporting member for executing the article confirmation process, in addition to extending the article supporting member to the projecting position at the fetching level, the article supporting member is raised to the target reading-out level higher than the fetching level by the raised amount for reading. Thus, it is possible to avoid the influence that a radio wave transmitted from the RFID reader is cut off or the influence that a radio wave returned to the RFID reader from the RFID tag is cut off due to the plate-like member made of metal for supporting the container forming the storage unit, as a result of which the identification information stored in the RFID tag can be appropriately read out by the RFID reader.

To explain additionally, when the article supporting member is extended to the projecting position at the fetching level, the RFID reader provided in the article supporting member and the RFID tag provided in the article storage container are positioned within a range in which the RFID reader can read out the identification information stored in the RFID tag. However, the RFID reader may not read out the identification information stored in the RFID tag appropriately because of the influence that the radio wave transmitted from the RFID reader or the radio wave returned from the RFID tag is cut off or weakened due to the plate-like member because the plate-like member for receiving the container forming the storage unit is disposed between the RFID reader and the RFID tag. According to the characteristic feature of the present invention, in addition to being extended to the projecting position at the fetching level, the article supporting member is raised to the target reading-out level higher than the fetching level by the raised amount for reading, which can avoid the influence that the radio wave transmitted from the RFID reader or the radio wave returned from the RFID tag is cut off or weakened by the plate-like member. As a result, the identification information stored in the RFID tag is appropriately read out by the RFID reader.

Although the passive-type RFID tag does not need any power source, and thus is small and inexpensive, it is required to place the RFID tag and the RFID reader close to each other and to ensure that any object cutting off the radio wave is not present between the tag and the reader in order for the RFID reader to read out the identification information stored in the RFID tag. According to the characteristic feature of the present invention, as noted above, in addition to being extended to the projecting position at the fetching level, the article supporting member is raised to the target reading-out level higher than the fetching level by the raised amount for reading, which can avoid the influence that the radio wave transmitted from the RFID reader or the radio wave returned from the RFID tag is cut off or weakened by the plate-like member to allow the RFID reader to appropriately read out the identification information stored in the RFID tag.

It should be noted that the article storage container per se may weaken or cut off the radio wave transmitted from the RFID reader or the radio wave returned from the RFID tag when the RFID reader reads out the identification information stored in the RFID tag. More particularly, the article storage container is generally made of synthetic resin, and thus the radio wave permeates the article storage container to some extent. Nonetheless, the identification information stored in the RFID tag is sometimes difficult to read out by the RFID reader due the influence that the article storage container cuts off the radio wave.

Even in such a case, a gap through which the radio wave passes may be formed between the article storage container and the plate-like member of the storage unit by raising the article supporting member to the target reading-out level higher than the fetching level by the raised amount for reading and then allowing the article storage container to rise from the plate-like member for receiving the container of the storage unit. As a result, the identification information stored in the RFID tag can be appropriately read out using the RFID reader.

Here, it should be noted that the article storage container does not always need to rise from the plate-like member of the storage unit if the gap through which the radio wave passes is formed between the article storage container and the plate-like member of the storage unit because a leg portion is formed in the bottom of the article storage container, for example, with the article storage container being placed on the plate-like member of the storage unit for receiving the container or the article storage container has high permeability relative to the radio wave. Even if the article storage container is not raised from the plate-like member of the storage unit, it becomes possible for the RFID reader to read out the identification information stored in the RFID tag if the RFID reader is designed to be raised by raising the article supporting member to the target reading-out level higher than the fetching level by the raised amount for reading.

Therefore, the characteristic feature of the present invention can provide the article storage equipment in which the article confirmation process is appropriately performed and the time required for that process can be reduced at the same time.

Another characteristic feature of the present invention lies in that the raised amount for reading is determined to be smaller than the raised amount for fetching.

According to this characteristic feature, in the reading-out operation process, when the article supporting member is raised to the target reading-out level that is higher than the fetching level by the raised amount for reading, in addition to extending the article supporting member to the projecting position at the fetching level, the raised amount for reading is determined to be smaller than the raised amount for fetching. Thus, the amount of raising the article supporting member from the fetching level is reduced in the reading-out operation process for the article confirmation process, which may reduce the time required for the article confirmation process further.

More particularly, although the raised amount for reading is determined to be smaller than the raised amount for fetching in performing the fetching process for taking out the article storage container of the storage unit, the influence that the radio wave transmitted from the RFID reader or the radio wave returned from the RFID tag is weakened or cut off by the plate-like member is diminished by raising the article supporting member from the fetching level, which allows the RFID reader to read out the identification information stored in the RFID tag appropriately.

When it is difficult for the RFID reader to read out the identification information stored in the RFID tag because the radio wave transmitted from the RFID reader or the radio wave returned from the RFID tag is weakened or cut off by the article storage container, the raised amount for reading should be determined to an amount for allowing the article storage container to rise from the plate-like member for receiving the container of the storage unit, while being smaller than the raised amount for fetching in executing the fetching process for taking out the article storage container of the storage unit. As a result, the gap through which the radio wave passes may be formed between the article storage container and the plate-like member of the storage unit to allow the RFID reader to appropriately read out the identification information stored in the RFID tag.

Also, if the gap through which the radio wave passes is present between the article storage container and the plate-like member of the storage unit because the leg portion is formed in the bottom of the article storage container with the article storage container being placed on the plate-like member for receiving the container of the storage unit, the raised amount for reading may be set to an amount for allowing the RFID reader to be positioned at a level in which the transmitted radio wave easily passes through the gap between the article storage container and the plate-like member of the storage unit without raising the article storage container from the plate-like member for receiving the container, as a result of which the RFID reader can appropriately read out the identification information stored in the RFID tag.

Therefore, the characteristic feature of the present invention may provide the article storage equipment that is capable for further reducing the time required for the article confirmation process.

A further characteristic feature of the article storage equipment of the present invention lies in that the opening formed in the plate-like member has a shape along an outer peripheral contour of an end portion of the article supporting member in the projecting position, and a cutout portion is formed in the plate-like member to continue from the opening and to be depressed toward the side of the RFID tag with the article storage container being placed on the storage unit.

More particularly, the opening formed in the plate-like member of the storage unit, through which the article supporting member passes, is shaped along the outer peripheral contour of the end portion of the article supporting member in the projecting position. As a result, the strength of the plate-like member may be increased for properly supporting the article storage unit, compared with an arrangement in which the opening is sufficiently larger than the outer peripheral contour of the end portion of the article supporting member in the projecting position.

Further, the cutout portion is formed in the plate-like member for receiving container to continue from the opening and to be depressed toward the side of the RFID tag with the article storage container being placed on the storage unit. As a result, the cutout portion is useful for allowing the radio wave transmitted from the RFID reader or the radio wave returned from the RFID tag to pass the opening. Therefore, it becomes possible to minimize the raised amount for reading as much as possible and cut down the time required for the article confirmation process when the article supporting member is raised to the target reading-out level higher than the fetching level by the raised amount for reading, while the opening formed in the plate-like member is shaped along the outer peripheral contour of the end portion of the article supporting member in the projecting position.

It is also considered to provide an arrangement in which the cutout portion formed in the plate-like member is formed as a wide and large cutout portion depressed toward the side of the RFID tag to a great extent to allow the RFID reader to read out the identification information of the RFID tag only by extending the article supporting member to the projecting position at the fetching level. However, in that case, since the strength of the plate-like member is diminished due to the formation of the large opening, such an arrangement is not suitable for practical use.

Thus, the present invention may provide the article storage equipment capable of increasing the strength of the plate-like member for receiving the article and yet reducing the time required for the article confirmation process.

A still further characteristic feature of the present invention lies in that, in the reading-out operation process, the control means is configured to start the reader reading out of the identification information of the RFID tag when allowing the article supporting member to extend to the projecting position at the fetching level and then to be raised to the target reading-out level from the fetching level, and suspend the rising movement of the article supporting member to allow the article supporting member to be lowered to the fetching level and withdrawn to the retracted position when the reading-out of the identification information of the RFID tag by the RFID reader is completed in the course of raising the article supporting member from the fetching level to the target reading-out level.

More particularly, when the reading-out operation is executed for the article confirmation process, the reading-out of the RFID tag by the RFID reader is started when the article supporting member is extended to the projecting position at the fetching level and then raised to the target reading-out level from the fetching level.

When the reading-out of the identification information of the RFID tag by the RFID reader is completed in the course of raising the article supporting member from the fetching level to the target reading-out level, the rising movement of the article supporting member is suspended even if the article supporting member has yet to reach the target reading-out level, the article supporting member is lowered to the fetching level and withdrawn to the retracted position.

The target reading-out level to which the article supporting member is raised is determined through experimentation, for example, to achieve a level at which the RFID reader may read out the identification information of the RFID tag even when the condition in which the article storage container is stored in the storage unit is somewhat changed, for example. However, it is not the case that the reading-out of the RFID tag by the RFID reader cannot be performed unless the article supporting member is raised to the target reading-out level. The identification information may be read out even in the course of raising the article supporting member to the target reading-out level on the grounds that the article storage container may be stored in the storage unit in good condition for reading, for example.

To this end, the rising movement of the article supporting member is suspended even if the article supporting member has yet to reach the target reading-out level when the reading-out of the RFID tag by the RFID reader is completed in the course of raising the article supporting member to the target reading-out level from the fetching level. Then, the article supporting member is lowered to the fetching level and withdrawn to the retracted position. As a result, the time required for the article confirmation process can be further reduced, compared with the case where the article supporting member is always raised to the target reading-out level.

Thus, the present invention may provide the article storage equipment capable of further reducing the time required for the article confirmation process.

A still further characteristic feature of the present invention lies in that the article storage container is an FOUP for accommodating a substrate and the RFID tag is provided in a portion corresponding to a rear side of the FOUP with the FOUP being placed on the article supporting member, and the plate-like member is provided with an upright positioning pin for engaging with a positioning recess formed in a bottom portion of the FOUP.

More particularly, when the article storage unit is the FOUP for storing the substrate, the RFID tag is provided in the portion corresponding to the rear side of the FOUP with the FOUP being placed on the article supporting member in conformity to SEMI (Semiconductor Equipment and Materials International) standards.

In order to place the FOUP on the plate-like member for receiving the container of the storage unit, the upright positioning pin is provided in the plate-like member for engaging with the positioning recess formed in the bottom portion of the FOUP. The FOUP is placed on the plate-like member with the FOUP being horizontally positioned with the upright positioning pin provided in the plate-like member.

In this manner, when the article storage unit is the FOUP for storing the substrate, the RFID tag is provided in the portion corresponding to the rear side of the FOUP with the FOUP being placed on the article supporting member. Therefore, it is difficult for the RFID reader provided in the lower side portion of the article supporting member to read out the identification information stored in the RFID tag only by projecting the article supporting member into the storage unit at the fetching level because the plate-like member weakens or cuts off the radio wave. In this, the identification information stored in the RFID tag may be read out by the RFID reader by performing the above-noted reading-out operation process.

It should be noted that because the positioning pin is engaged with the positioning recess formed in the bottom portion of the FOUP, the FOUP is raised to a small extent from the top surface of the plate-like member with the FOUP being horizontally positioned with the upright positioning pin provided in the plate-like member for receiving the container and placed on the plate-like member.

Therefore, it is not necessary in some cases to raise the article supporting member until the condition in which the FOUP rises from the article supporting member is achieved in raising the article supporting member to the target reading-out level from the fetching level in the reading-out operation process. Even when the article supporting member needs to be raised until the condition in which the FOUP rises from the article supporting member is achieved, it is sufficient that the article supporting member is raised with the FOUP rising from the article supporting member to a small extent.

In particular, when the cutout portion is formed in the plate-like member, the raised amount for reading for raising the article supporting member to the target reading-out level from the fetching level can be reduced.

Thus, the present invention may provide the article storage equipment capable of satisfactorily performing the article confirmation process for the FOUP storing the substrate.

A characteristic feature of a method of operating article storage equipment according to the present invention in order to achieve the above-noted object lies in comprising a storage section including a plurality of arranged storage units each for supporting and receiving an article storage container; conveying means movable in a direction of arranging the storage units within an article transporting space defined in a front side of the storage section and having transfer means operable to transfer the article storage container to the storage units; and control means for controlling operation of the conveying means, the transfer means having an article supporting member movable between a retracted position in the article transporting space and a projecting position to project into each of the storage units and also vertically movable for receiving the article storage container, the article supporting member being used in a fetching process for taking out the article storage container placed on any of the storage units and in a storing process for storing the article storage container placed on the article supporting member in any of the storage units;

the storage units each having a plate-like member made of metal for receiving the article storage container to be stored, the plate-like member having an opening through which the article supporting member in the projecting position vertically passes, the control means being configured to control the operation of the conveying means to extend the article supporting member to the projecting position at a fetching level lower than the plate-like member of the storage unit by a fixed amount, raise the article supporting member to a target fetching level higher than the fetching level by a raised amount for fetching, and then withdraw the article supporting member to the retracted position when the fetching process is performed, wherein the article storage container has a passive-type RFID tag storing identification information of the article storage container and provided in a portion of an outer periphery of the article storage container overlapping above the plate-like member with the article storage container being placed on the storage unit, the article supporting member has an RFID reader for reading out the identification information stored in the RFID tag, wherein the method of operating the article storage equipment comprising the steps of:

an extending step for extending the article supporting member to the projecting position at the fetching level when execution of an article confirmation process for allowing the RFID reader to read out the identification information of the RFID tag provided in the article storage container stored in the storage unit is instructed;

a raising step for raising the article supporting member to a target reading-out level higher than the fetching level by a raised amount for reading and for staring the RFID reader reading out the identification information of the RFID tag;

a lowering step for lowering the article supporting member to the fetching level subsequent to the raising step; and a withdrawing step for withdrawing the article supporting member to the retracted position at the fetching level.

Therefore, in the same manner noted above, the characteristic feature of the present invention can provide the article storage equipment in which the article confirmation process is appropriately performed and the time required for that process can be reduced at the same time.

Another characteristic feature of the method of operating the article storage equipment according to the present invention lies in that, in the raising step, when reading out of the identification information of the RFID tag by the RFID reader is started and when the reading-out of the identification information by the reader D is completed in the course of raising the article supporting member from the fetching level to the target reading-out level, the raising movement of the article supporting member is suspended to shift to the lowering step.

Therefore, in the same manner noted above, the characteristic feature of the present invention may provide the article storage equipment that is capable for further reducing the time required for the article confirmation process.

BEST MODE FOR CARRYING OUT INVENTION

Embodiments of article storage equipment and a method of operating the same according to the present invention will be described hereinafter in reference to the accompanying drawings.

Figure 1:
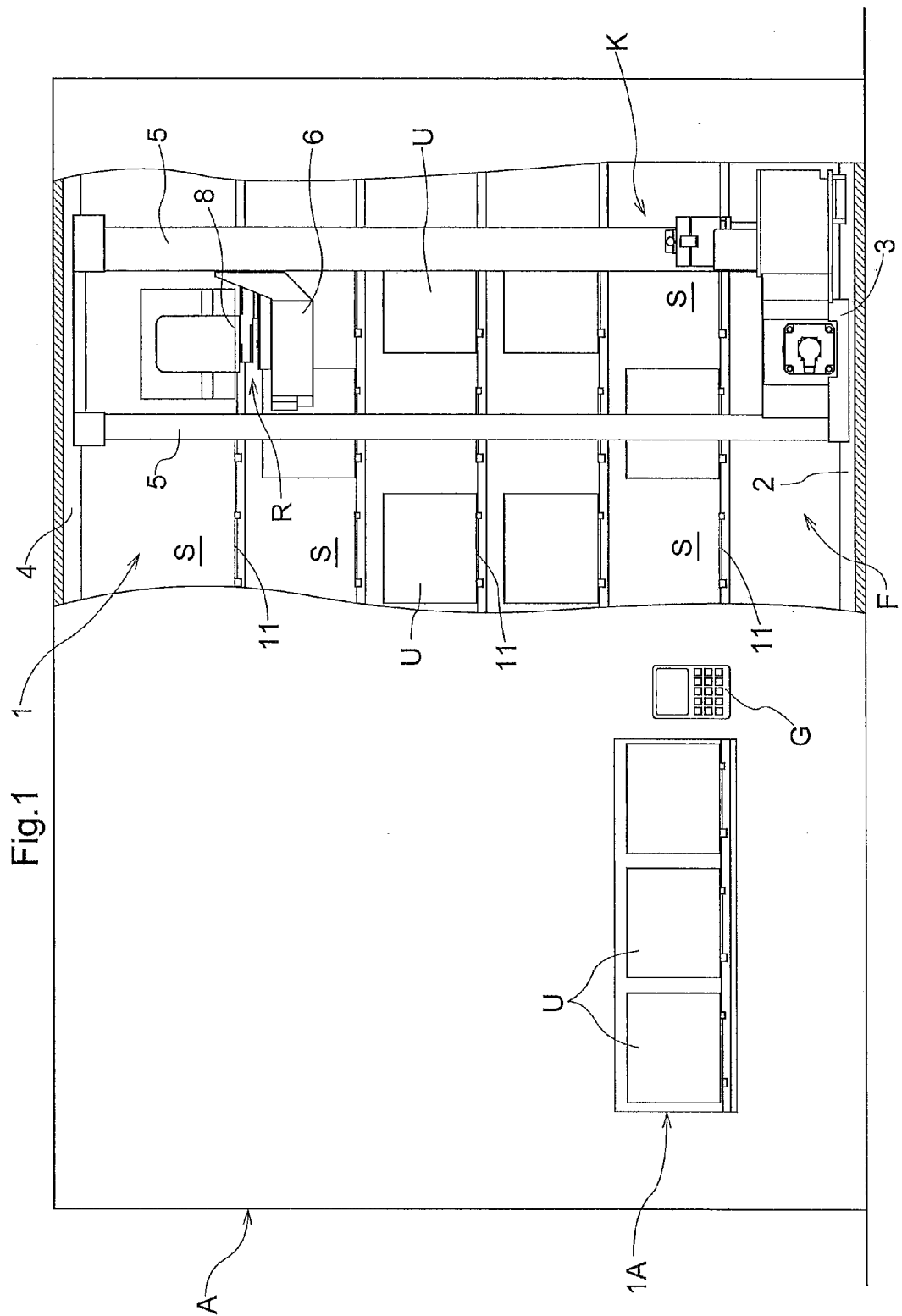
FIG. 1 is a partially cut-away front view of article storage equipment.
Figure 2:
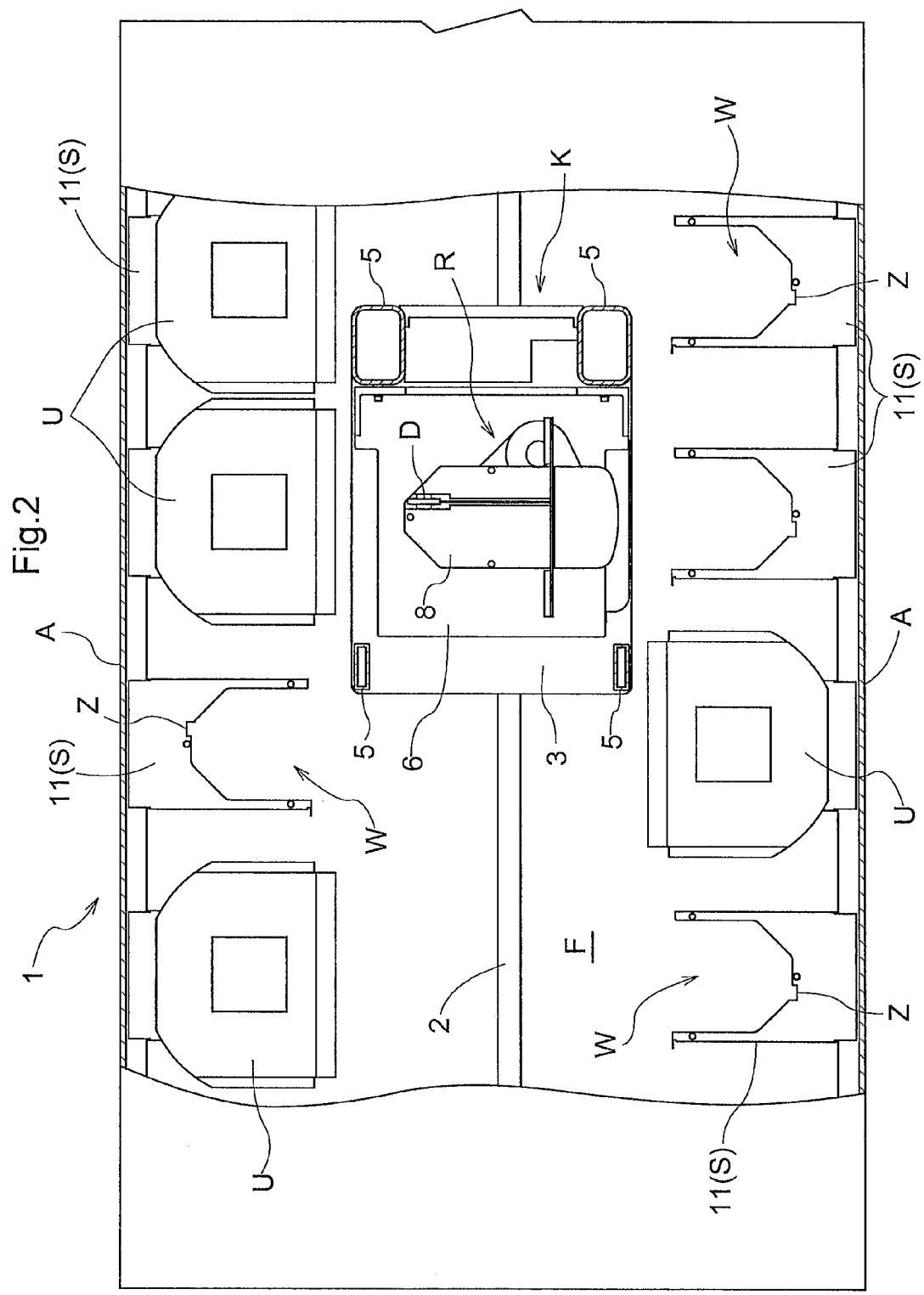
FIG. 2 is a partially cut-away top plan view of the article storage equipment.

As shown in FIGS. 1 an 2, the article storage equipment includes storage shelves 1 having a fore-and-aft pair of storage sections A, a stacker crane K acting as conveying means provided in a front side of the storage section A, that is, provided in an article transporting space F defined between the pair of storage sections A, and a control section H (see FIG. 10) acting as control means for controlling operation of the stacker crane K. Each of the storage shelves 1 is covered with a wall member in an outer periphery.

Each of the pair of storage sections A includes a plurality of storage units S arranged vertically and horizontally each for receiving and supporting an FOUP (front-opening unified pod; referred to as "container" hereinafter) U acting as an article storage container for storing a substrate. In part of one of the pair of storage sections A is provided an article access portion 1A for carrying in the container U from the outside and carrying out the container U to the outside. The control section H is configured to control the operation of the stacker crane K in order to transport the container U between each storage unit S of the pair of storage sections A and the article access portion 1A using the stacker crane K, that is, to perform a loading process for storing the container U that has been carried in the article access portion 1A in the storage unit S and perform an unloading process for delivering the container U that has been stored in the storage unit S to the article access portion 1A.

In addition to the loading and unloading processes, the control section H is also configured to control the operation of the stacker crane K in order to perform an article confirmation process for reading out identification information of the containers U stored in the plurality of storage units S as described later.

Here, while the control section H may control the operation of the stacker crane K in order to transport the container U stored in one of the storage units S to another storage unit S, that is, to perform a storage location changing process for changing the location for storing the container U, any description of such a storage location changing process is omitted in the current embodiment.

Figure 3:
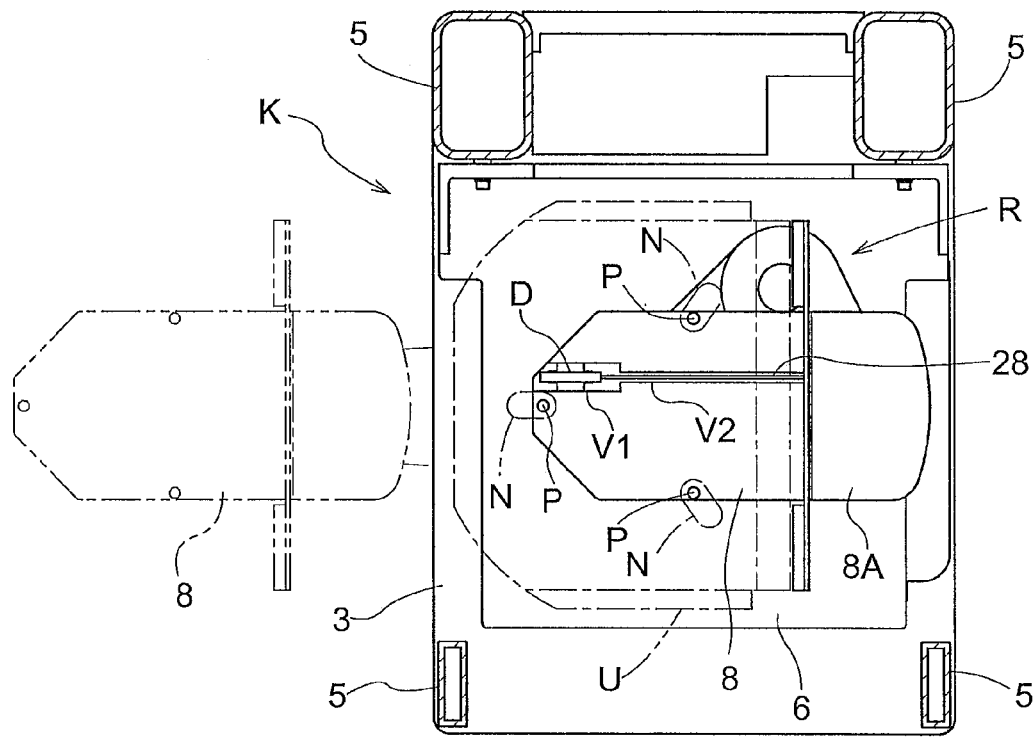
FIG. 3 is a top plan view of transfer means.

The container U, that is, FOUP is an airtight container made of synthetic resin conforming to SEMI (Semiconductor Equipment and Materials Institute) standards to be used for storing a semiconductor wafer as the substrate. Although not being described in detail, the container U has a front surface having an opening formed therein to be opened and closed by a detachable lid for ingress/egress of the substrate, a top flange formed in a top surface thereof held by a hoist-type conveying means, and three engaging grooves N formed in a bottom surface thereof for receiving positioning pins P and Q (see FIG. 5) as shown in FIGS. 3 and 6.

One of the three engaging grooves N is formed in a lateral central portion in a rear side of the container U with its longitudinal direction agreeing with the fore-and-aft direction. The remaining two grooves are formed in lateral opposite portions in a front side of the container U with their longitudinal directions extending toward a central portion. Each of the three engaging grooves N has a vertical section tapered toward the depth (upper side in the drawings).

The stacker crane K includes a running carriage 3 making reciprocating motion along a traveling rail 2 laid on a floor, posts 5 vertically extending upward from the running carriage 3 and guided by guide rails 4 provided in a ceiling, a lift deck 6 guided along the posts 5 to be vertically movable, and transfer means R mounted on the lift deck 6.

The transfer means R is configured to move along a direction of arranging the storage units S, that is, along a transverse direction and vertical direction of the storage sections A in the article transporting space F for transporting the article by the vertical movement of the lift deck 6 and to transfer the container U to the storage unit S.

The transfer means R is also used for performing a fetching process to fetch the container U placed on the storage unit S with an article supporting member 8 that is made of aluminum and movable between a retracted position to withdraw into the article transporting space F and a projecting position to extend to the storage unit S and also vertically movable and for performing a storing process to store the container U placed on the article supporting member 8 in the storage unit S. While there are various specific ways to fetch the container U placed on the storage unit S, the current embodiment employs a scooping method for scooping the container U with the article supporting member 8 from below. Similarly, while there are various specific ways to store the container U placed on the article supporting member 8 in the storage unit S, the current embodiment employs an unloading operation for taking the container U supported and placed on the article supporting member 8 from below down to a plate-like member of the storage unit S.

The transfer means R is also used for performing the fetching process and storing process noted above relative to the article access portion 1A.

Figure 7:
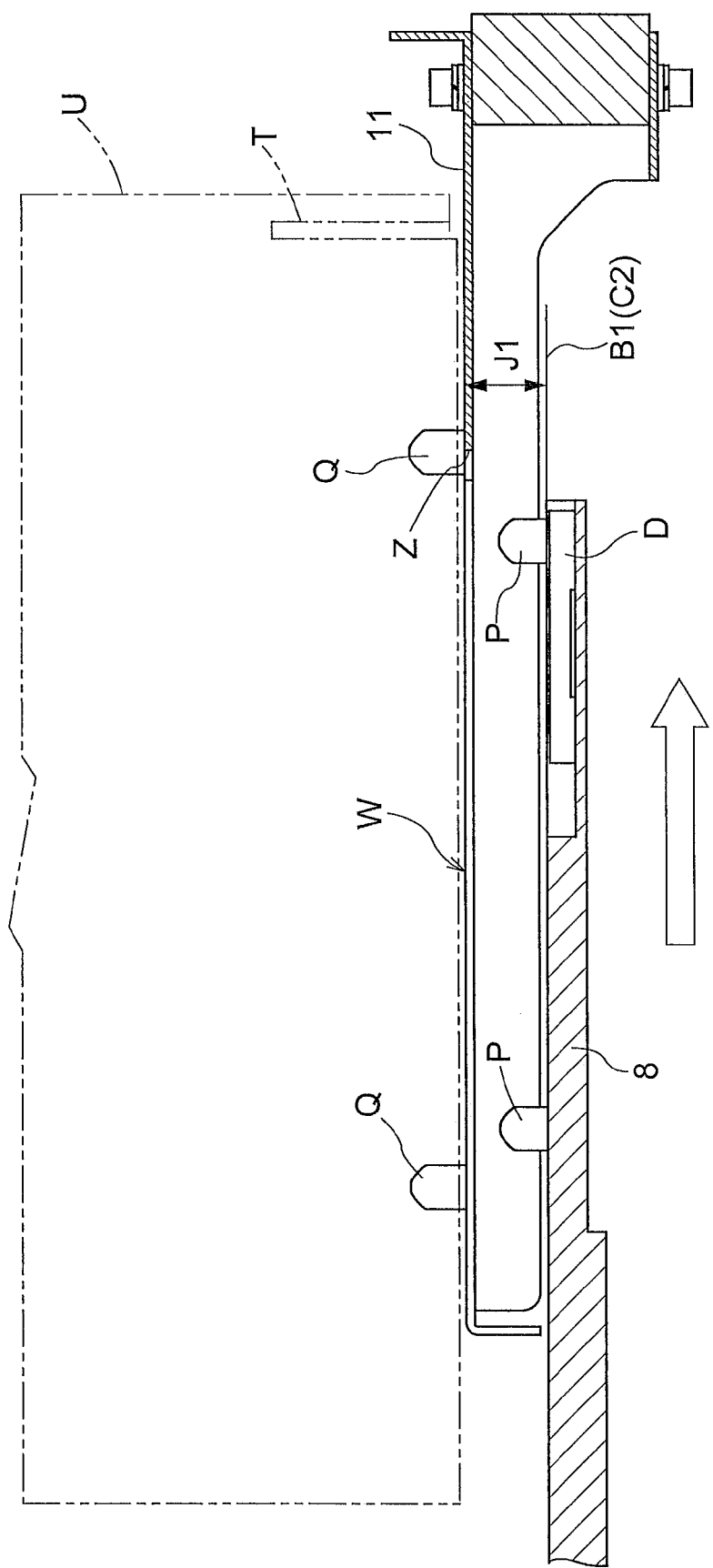
FIG. 7 is a side view of the article supporting member in the projecting position at a fetching level.
Figure 8:
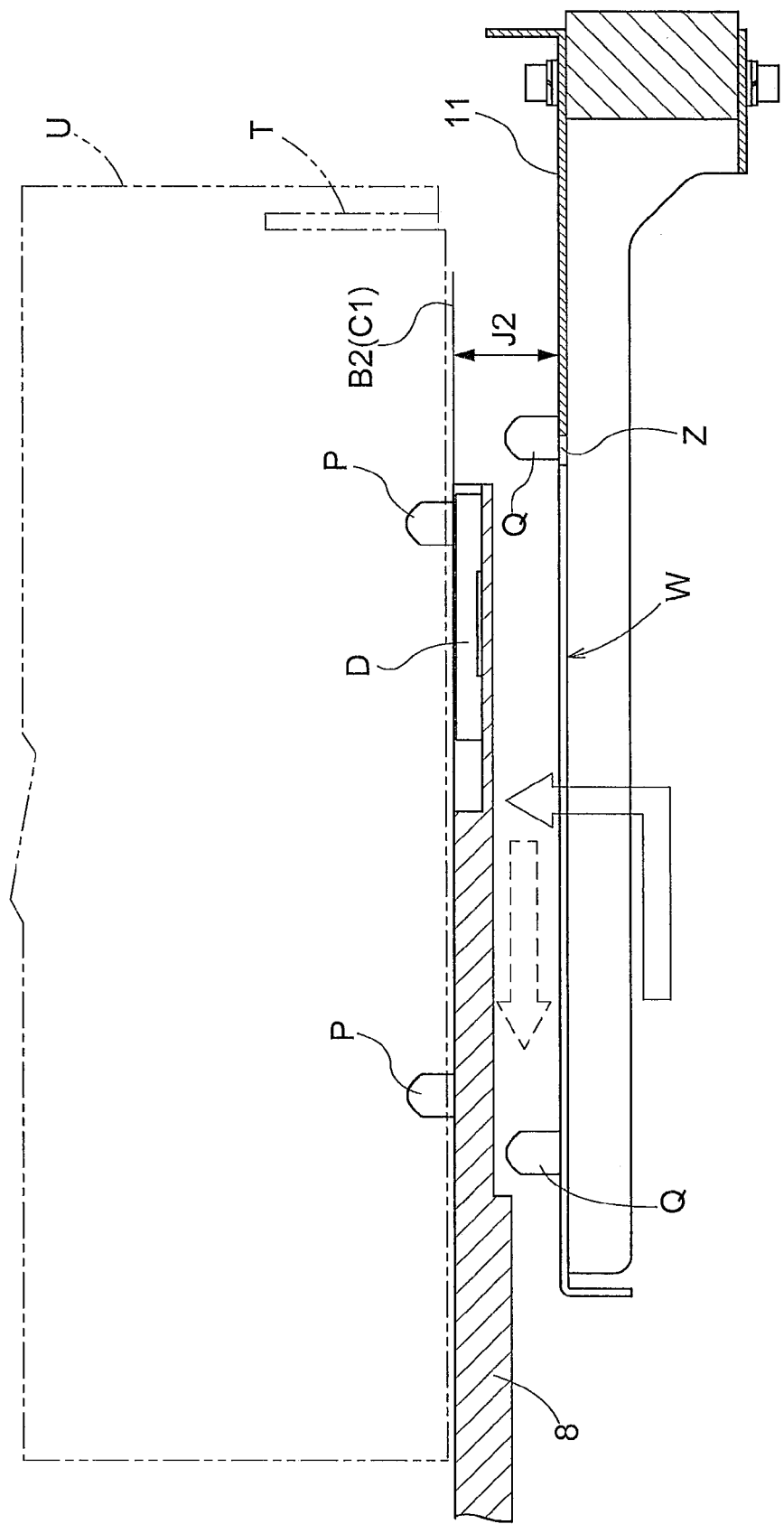
FIG. 8 is a side view of the article supporting member in the projecting position at a target fetching level.

The transfer means R is moved with the running movement of the running carriage 3 when performing the fetching process or storing process to be positioned at a predetermined transfer position in the transverse direction relative to the target storage unit S or the target article access portion 1A. The article supporting member 8 is moved with the vertical movement of the lift deck 6 to be positioned at a fetching level B1 relative to the target storage unit S or the target article access portion 1A in the fetching process as shown in FIG. 7, and to be positioned at a storing level C1 relative to the target storage unit S or the target article access portion 1A in the storing process as shown in FIG. 8.

More particularly, in the loading process for storing the container U carried in the article access portion 1A in the storage unit S, the transfer means R is firstly moved to the predetermined transfer position relative to the article access portion 1A and the article supporting member 8 is positioned at the fetching level B1, in which the fetching process is performed. Next, the transfer means R is moved to the predetermined transfer position relative to the storage unit S for storing the container U and the article supporting member 8 is positioned at the storing level C1, in which the storing process is performed.

Similarly, in the unloading process for taking out the container U stored in the storage unit S to the article access portion 1A, the transfer means R is firstly moved to the predetermined transfer position relative to the storage unit S storing the container U to be delivered and the article supporting member 8 is positioned at the fetching level B1, in which the fetching process is performed. Next, the transfer means R is moved to the predetermined transfer position relative to the article access portion 1A and the article supporting member 8 is positioned at the storing level C1, in which the storing process is performed.

In the current embodiment, the article access portion 1A includes three container supporting portions arranged side by side, for example. In performing the loading process or the unloading process, the control section H is designed to select one of the three container supporting portions to control the operation of the stacker crane K or the transfer means R.

Figure 4:
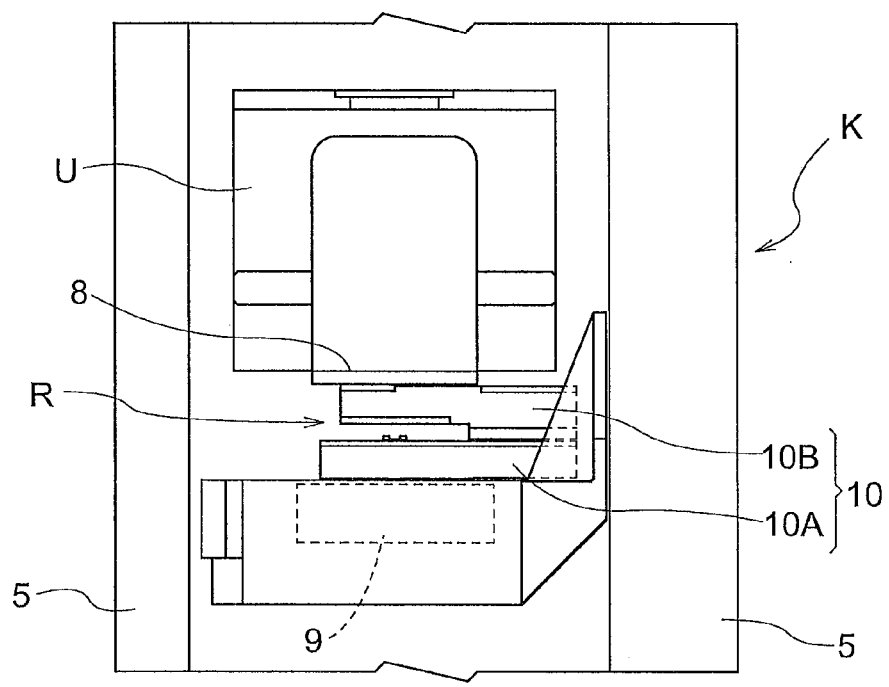
FIG. 4 is a rear view of the transfer means.

To give an additional explanation on the transfer means R, as shown in FIGS. 3 and 4, a SCARA (Selective Complaint Assembly Robot Arm) arm unit 10 is attached to a turntable 9 rotatable about a vertical axis relative to the lift deck 6. The article supporting member 8 is attached to a distal end of the SCARA arm unit 10.

The SCARA arm unit 10 has a first arm 10A attached to the turntable 9 to be pivotable about the vertical axis, and a second arm 10B attached to a distal end of the first arm 10A to be pivotable about the vertical axis. The article supporting member 8 is mounted on the distal end of the second arm 10B to be pivotable about the vertical axis.

Then, the article supporting member 8 is moved between the projecting position and the retracted position by extension and contraction of the SCARA arm unit 10.

More particularly, an interlocking member for interlocking the first arm 10A, second arm 10B and article supporting member 8 is provided in the interiors of the first arm 10A and second arm 10B. When the first arm 10A of the SCARA arm unit 10 is pivoted relative to the turntable 9, the second arm 10B is pivoted relative to the first arm 10A in coordination with the pivotal movement of the first arm 10A and the article supporting member 8 is pivoted relative to the second arm 10B. Thus, the article supporting member 8 is operated between the projecting position and the retracted position as the first arm 10A is pivoted forwardly and reversely.

Further, with the rotational movement of the turntable 9, the article supporting member 8 is switched between a position to extend toward one of the pair of storage sections A and a position to extend toward the other of the pair of storage sections A.

Figure 5:
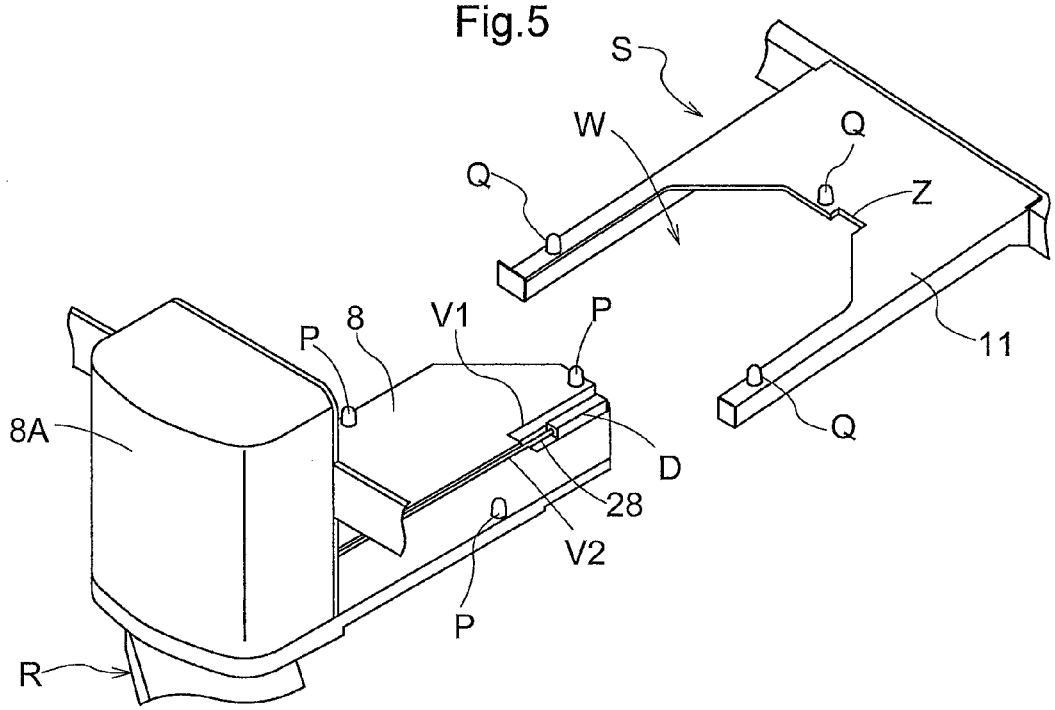
FIG. 5 is a perspective view of a storage unit and an article supporting member.
Figure 6:
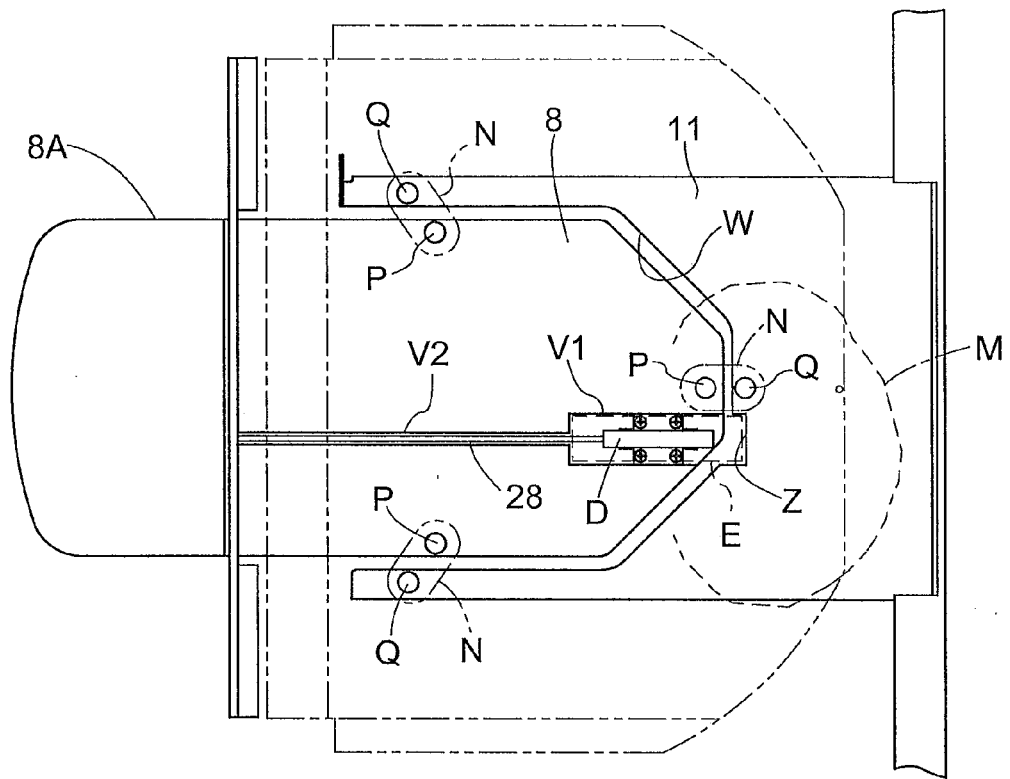
FIG. 6 is a top plan view of the article supporting member in a projecting position.

As shown in FIGS. 5 and 6, each of the storage units S of the storage sections A and the three container supporting portions of the article access portion 1A is formed of the plate-like member 11 for receiving the container. The plate-like member 11 is made of metal and has an opening W through which the article supporting member 8 in the projecting position passes.

More particularly, the article supporting member 8 forming the transfer means R has a trapezoidal end portion, while the opening W through which the article supporting member 8 passes formed in the plate-like member 11 for receiving the container has a trapezoidal shape along an outer peripheral contour of the end portion of the article supporting member 8 in the projecting position.

The current embodiment employs stainless steel as the metal for forming the plate-like member 11. It should be noted that stainless steel is a ferromagnetic material in contrast to aluminum forming the article supporting member 8.

As explicitly shown in FIG. 5, the article supporting member 8 and the plate-like member 11 for receiving the container have the above-noted upright positioning pins P and Q for engaging with the three engaging grooves N formed in the bottom surface of the container U. The article supporting member 8 is designed to receive and support the container U, positioned by the positioning pins P. On the other hand, the plate-like member 11 for receiving the container is designed to receive and support the container U, positioned by the positioning pins Q.

Since the positioning pins P provided in the article supporting member 8 are configured to engage with the engaging grooves N formed closer to central positions than the positioning pins Q provided in the plate-like member 11 for receiving the container, both the positioning pins P and Q can be simultaneously engaged in the engaging grooves N of the container U.

When the article supporting member 8 is positioned by the positioning pins P to support the container U, that is, when the positioning pins P are engaged in the engaging grooves N, the container U rises from the article supporting member 8 to define a gap (approximately 1 to 2 mm) between the bottom portion of the container U and the top surface of the article supporting member 8. Similarly, when the plate-like member 11 is positioned by the positioning pins Q to support the container U, that is, when the positioning pins Q are engaged in the engaging grooves N, the container U rises from the article supporting member 8 and plate-like member 11 to define a gap (approximately 1 to 2 mm) between the bottom portion of the container U and the top surface of the plate-like member 11.

Since the storage unit S supports the container U on the plate-like member 11 for receiving the container, the above-noted fetching level B1 in the fetching process for the transfer means R is determined at a level lower than the top surface of the plate-like member 11 by a fixed amount J1 (approximately 19 mm, for example).

The control section H is configured to extend the article supporting member 8 to the projecting position at the fetching level B1 lower than the plate-like member 11 by the fixed amount in the fetching process as shown in FIG. 7, and then raise the article supporting member 8 to a target fetching level B2 higher than the fetching level B1 by a raised amount for fetching as shown in FIG. 8 to control the operation of the stacker crane K in order to withdraw the article supporting member 8 into the retracted position.

The above-noted target fetching level B2 is determined at a level higher than the top surface of the plate-like member 11 by a fixed amount J2 (approximately 26 mm, for example). Therefore, the raised amount for fetching is approximately 45 mm.

Further, since the storage unit S supports the container U on the plate-like member 11, the above-noted storing level C1 in the storing process performed through the transfer means R is determined at a level higher than the top surface of the plate-like member 11 by a fixed amount (approximately 26 mm, for example).

The control section H is configured to extend the article supporting member 8 to the projecting position at the storing level C1 higher than the plate-like member 11 by the fixed amount in the storing process (see FIG. 8), and lower the article supporting member 8 to a target storing level C2 lower than the storing level C1 by a lowered amount for storage (see FIG. 7), and then withdraw the article supporting member 8 into the retracted position, thereby to control the operation of the stacker crane K.

The above-noted target storing level C2 is determined at a level lower than the top surface of the plate-like member 11 by a fixed amount (approximately 19 mm, for example). Thus, the lowered amount for storage is approximately 45 mm.

As apparent from the above description, in the current embodiment, the storing level C1 in the storing process is the same as the target fetching level B2 in the fetching process, while the target storing level C2 in the storing process is the same as the fetching level B1 in the fetching process.

Further, a passive-type RFID tag (referred to simply as "tag" hereinafter) T for storing the identification information of the container U is provided in a portion of an outer periphery of the container U overlapping above the plate-like member 11 for receiving the container with the container U being placed on the storage unit S. On the other hand, an RFID reader (referred to simply as "reader" hereinafter) D is provided in the article supporting member 8 in the transfer means R for reading out the identification information stored in the tag T.

Since the container U is the FOUP in the current embodiment, the tag T is attached to a portion corresponding to a lower rear side of the container U with the container U being placed on the plate-like member 11 of the storage unit S.

Figure 10:
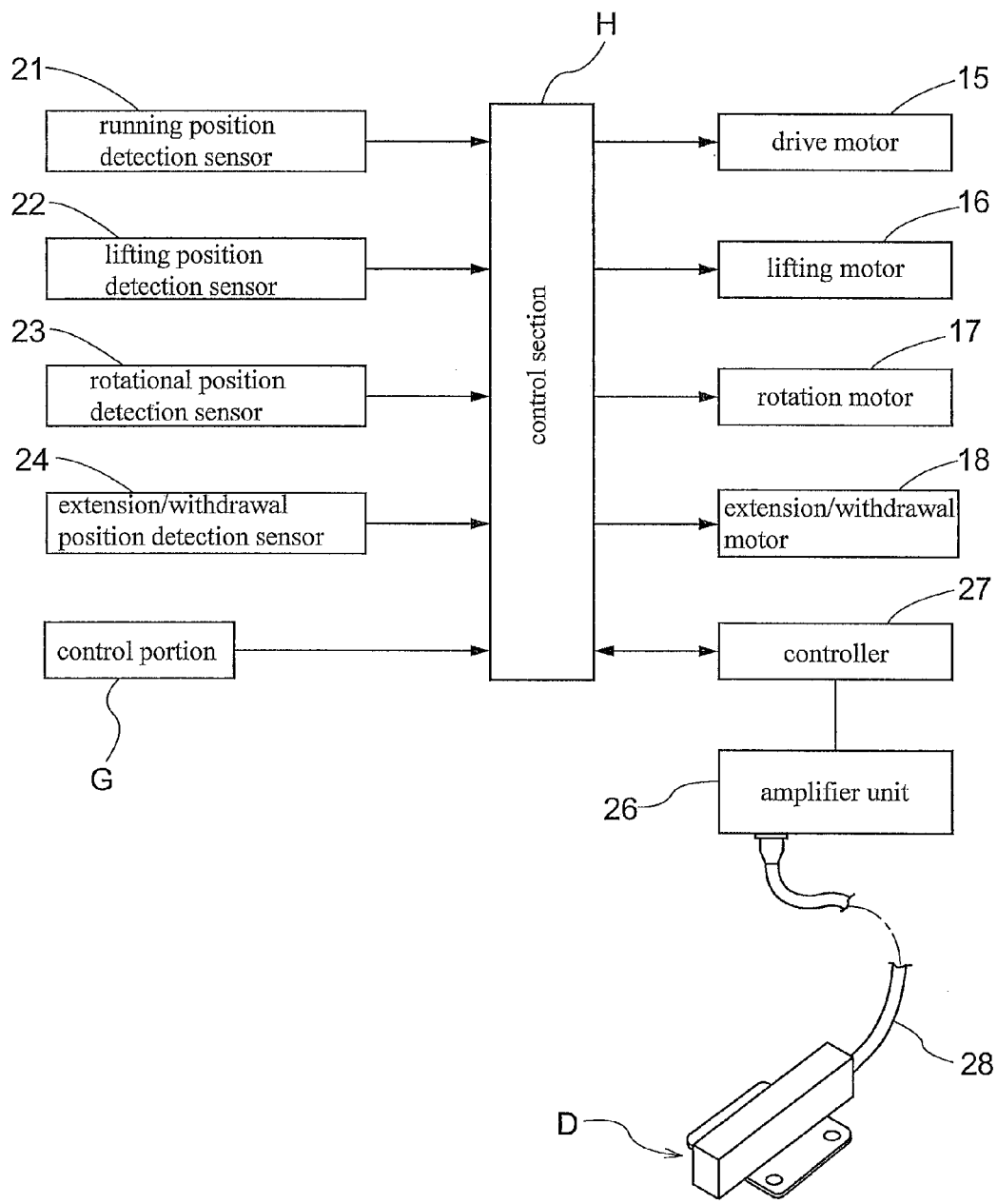
FIG. 10 is a block diagram showing a control system.

As shown in FIG. 10, the reader D is connected to an amplifier unit 26 for activating the reader. The amplifier unit 26 is in turn connected to a controller 27 which is in turn connected to the control section H.

The controller 27 is configured to activate the amplifier unit 26 for repeating transmission from the reader D and reception by the reader D when the control section H gives a reading-out start instruction, and to stop the operation of the amplifier unit 26 when the identification information stored in the tag T is read out.

As shown in FIGS. 5 and 6, the reader D is bolt fixed to the article supporting member 8, coming into a recess V1 formed in a top surface of the article supporting member 8 at a distal end portion thereof. The amplifier unit 26 is accommodated in an accessories housing box 8A provided in a proximal end portion of the article supporting member 8. A connecting cable 28 for connecting the amplifier unit 26 to the reader D is arranged within a recess groove V2 formed in the upper surface of the article supporting member 8.

Reading-out from the tag T by the reader D is performed when the controller 27 transmits a radio wave including a control signal from the reader D.

More particularly, when receiving the radio wave from the reader D, the tag T produces an electromotive force from the received radio wave, reads out details of the control signal, and modulates the identification information using the received radio wave as a carrier wave to allow it to go on the wave.

When the reader D receives the radio wave returned from the tag T, the received wave is amplified at the amplifier unit 26, and then the controller 27 decodes a signal from the amplifier unit 26 to analyze the identification information of the tag T to transmit the identification information to the control section H.

The controller 27 is configured to repeat the reading-out from the tag T when the reading-out start instruction is given from the control section H until the identification information of the tag T is analyzed or until a read-out stop instruction is given from the control section H.

The article confirmation process noted above is a process for reading out the identification information of the tag T provided in the container U stored in the storage unit S with the reader D.

Figure 9:
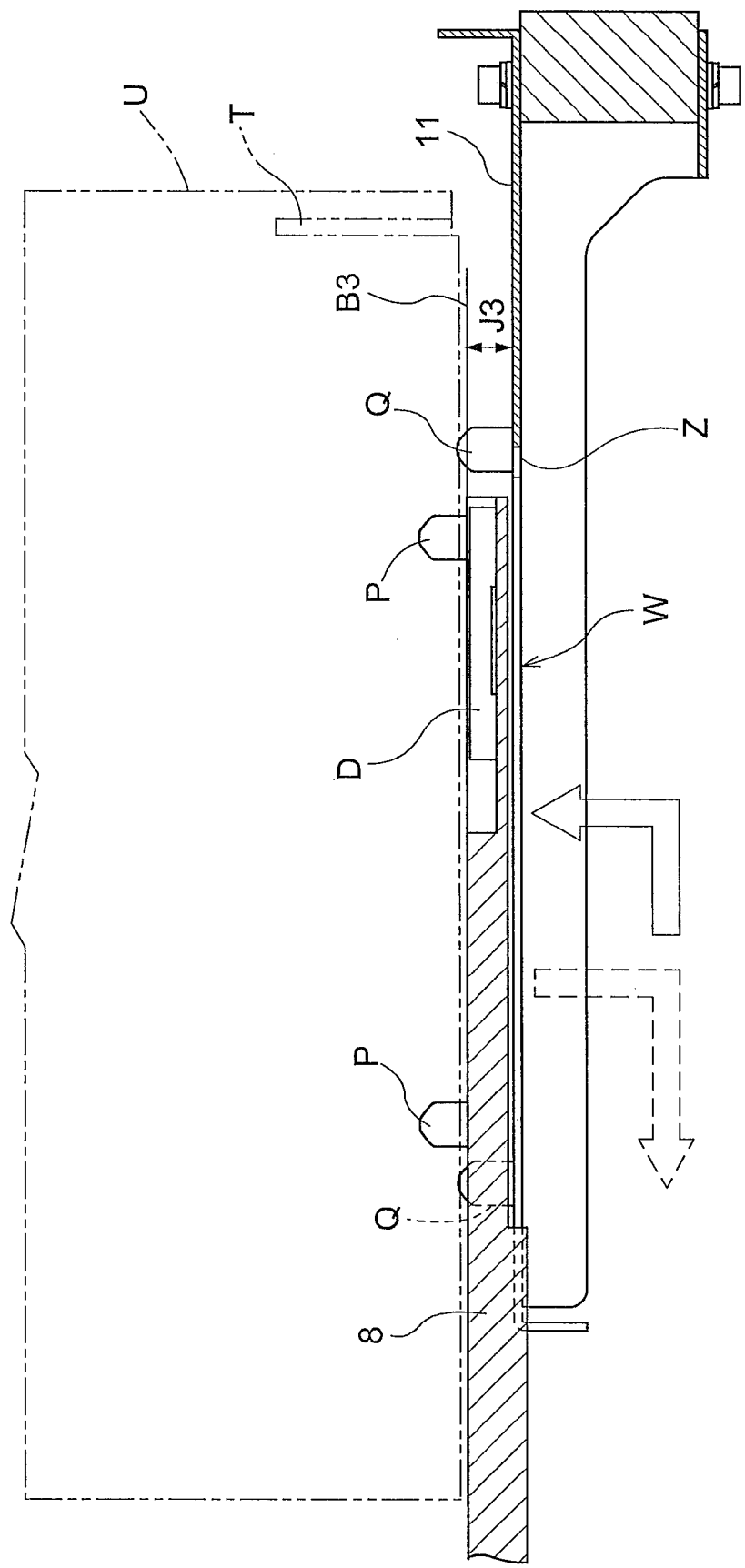
FIG. 9 is a side view of the article supporting member in the projecting position at a target reading-out level.

The control section H is configured to perform a reading-out operation process for controlling the operation of the stacker crane K as follows. As shown in FIG. 7, when the execution of the article confirmation process is instructed, the transfer means R is moved to the predetermined transfer position relative to the storage unit S that stores the container U to be confirmed and the article supporting member 8 is positioned in the fetching level B1 to extend to the projecting position. Next, as shown in FIG. 9, the article supporting member 8 is raised to a target reading-out level B3 that is higher than the fetching level B1 by a raised amount for reading, and then lowered to the fetching level B1 to be withdrawn into the retracted position.

In the current embodiment, the target reading-out level B3 is set to a level higher than the top surface of the plate-like member 11 for receiving the container by a fixed amount (approximately 10 mm, for example).

Since the fetching level B1 is set to the level lower than the top surface of the plate-like member 11 for receiving the container by the fixed, amount J1 (approximately 19 mm, for example) as noted above in the current embodiment, the raised amount for reading is approximately 29 mm that is smaller than the raised amount for fetching of approximately 45 mm noted above.

In short, the raised amount for reading is smaller than the raised amount for fetching in the current embodiment.

The article confirmation process needs to be performed on the containers U stored in all the storage units S provided in the storage shelves 1. The control section H is designed to move the transfer means R to all the storage units S according to a predetermined order when an instruction to perform the article confirmation process is given, thereby to perform the reading-out operation process noted above.

Although a specific example is omitted here, the lift deck 6 of the stacker crane K has an optical container-detection sensor for detecting the presence of the container U stored in the storage units S. When the article confirmation process is performed, the presence of the container U stored in each of the storage units S is confirmed by the container-detection sensor. While the control section H executes the above-noted reading-out operation process relative to the storage unit S storing the container U, the execution of the reading-out operation process is suspended.

The current embodiment employs a product manufactured by OMRON Corporation for transmitting the radio wave of 135 KHz (Model No. V640-HS62) as the reader D.

As shown in FIG. 6, the reader D is designed to secure a wide readable range M if no ferromagnetic material for removal of noise is present and no shielding object is present in a predetermined area E defined in an outer periphery of the reader D.

To this end, in the current embodiment, a cutout portion Z is formed in the plate-like member 11 to continue from the opening W for receiving the article supporting member and to be depressed toward the side of the tag T with the container U being placed on the storage unit S. The cutout portion Z has a size corresponding to the predetermined area E with the reader D being positioned in the level corresponding to the plate-like member 11.

Further, when the above-noted cutout portion Z is formed in the current embodiment, removal of noise by the plate-like member 11 for receiving the container and shield of the radio wave by the plate-like member 11 are avoided, and a gap between the bottom portion of the container U placed on the plate-like member 11 and the plate-like member 11 is used as a space for allowing the radio wave to pass through. As a result, the probability becomes considerably large that the reader D reads the identification information of the tag T in the course of raising the article supporting member 8 to the target reading-out level B3. Therefore, when the reader D succeeds in reading out the identification information of the tag T in the course of raising the article supporting member 8 to the target reading-out level B3, the control section H is configured to return the article supporting member 8 to the retracted position at that point.

More particularly, when the control section H operates the article supporting member 8 to extend to the projecting position at the fetching level B1 and then to be raised to the target reading-out level B3 from the fetching level B1 in the reading-out operation process, the control section H is configured to start the reader D reading out the identification information of the tag T, and suspend the rising movement of the article supporting member 8 to allow the article supporting member 8 to be lowered to the fetching level B1 and withdrawn to the retracted position when the reading-out of the identification information by the reader D is completed in the course of raising the article supporting member 8 from the fetching level B1 to the target reading-out level B3.

An additional description will be given hereinafter on the control of the stacker crane K by the control section H.

The control section H is provided with a microcomputer. As shown in FIG. 10, the control section H is configured to control operations of a drive motor 15 for driving the running carriage 3 of the stacker crane K, a lifting motor 16 for vertically moving the lift deck 6, a rotation motor 17 for rotating the turntable 9, and an extension/withdrawal motor 18 for pivoting the first arm 10A of the SCARA arm unit 10 to extend and retract the article supporting member 8 of the transfer means R.

Further, it is designed that detection information is inputted to the control section H from each of a running position detection sensor 21 for detecting a position of the running carriage 3 of the stacker crane K in its running path, a lifting position detection sensor 22 for a position of the lift deck 6 in its vertical movement path, a rotational position detection sensor 23 for detecting a rotational position of the turntable 9, and an extension/withdrawal position detection sensor 24 for detecting an extension/withdrawal position of the article supporting member 8 of the transfer means R. The detection information is stored in a storage device (not shown) such as a memory provided in the control section H. The storage device stores various kinds of information handled by the control section H to be writable and readable by the control section H. For example, the storage device stores information on the fetching level B1, target fetching level B2, target reading-out level B3, storing level C1 and target storing level C2.

In the current embodiment, the running position detection sensor 21 has a reed switch for detecting a running reference body provided in a reference position in the running path, and a rotary encoder for detecting rotational speed of the drive motor.

In the current embodiment, the lifting position detection sensor 22 has a reed switch for detecting a lifting reference body provided in a reference position in the vertical movement path, and a rotary encoder for detecting rotational speed of the lifting motor.

In the current embodiment, the rotational position detection sensor 23 has a reed switch for detecting a left position reference body determining a position in which the transfer means R is directed to the left and a right position reference body determining a position in which the transfer means R is directed to the right.

In the current embodiment, the extension/withdrawal position detection sensor 24 has a reed switch for detecting an extension/withdrawal reference body determining an extension/withdrawal reference position, and a rotary encoder for detecting rotational speed of extension/withdrawal motor.

A control portion G (see FIG. 1) is provided in the access portion 1A of the storage shelf 1 for giving a loading instruction, unloading instruction and instruction to perform the article confirmation process.

Therefore, the control section H is configured to perform the loading process, unloading process and article confirmation process based on the instruction given from the control portion G. More particularly, the control section H is configured to activate the plural motors 15 to 18 according to program information that is stored in advance, while confirming the running position of the stacker crane K, the lifting position of the lift deck 6, the direction of the transfer means R and the extension/withdrawal position of the article supporting member 8 based on the detection information received from the sensors 21 to 24, and then perform the loading process for storing the container U carried in the article access portion 1A in the storage unit S, the unloading process for taking out the container U stored in the storage unit S to the article access portion 1A, and the article confirmation process for reading out the identification information of the container U stored in each of the plurality of the storage units S.

Next, an additional description will be given on the control operation of the control section H based on the flowcharts of FIGS. 11 to 13.

Figure 11:
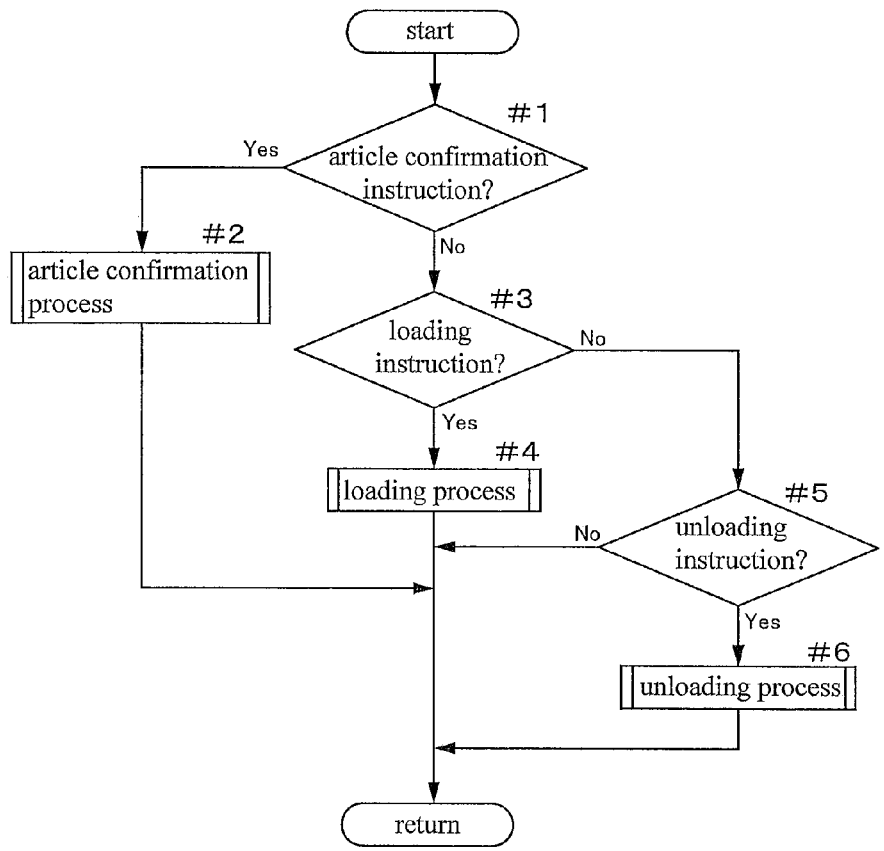
FIG. 11 is a flowchart showing a control operation.

As shown in FIG. 11, the control section H determines whether or not article confirmation is instructed first (#1), and then performs the article confirmation process if the execution of the article confirmation process is instructed (#2).

If the article confirmation is not instructed at step #1, the control section H determines whether or not a loading instruction is given (#3), and then performs the loading process if the loading instruction is given (#4).

If the loading instruction is not given at step #3, the control section H determines whether or not an unloading instruction is given (#5), and then performs the unloading process if the unloading instruction is given (#6).

Having performed the article confirmation process step (#2), loading process step (#4) and unloading process step (#6), the control section H repeats the steps from step #1.

Since the details of the loading process step (#4) and the unloading process step (#6) are apparent from the above descriptions, an additional description on the article confirmation process step (#2) will be given below.

Figure 12:
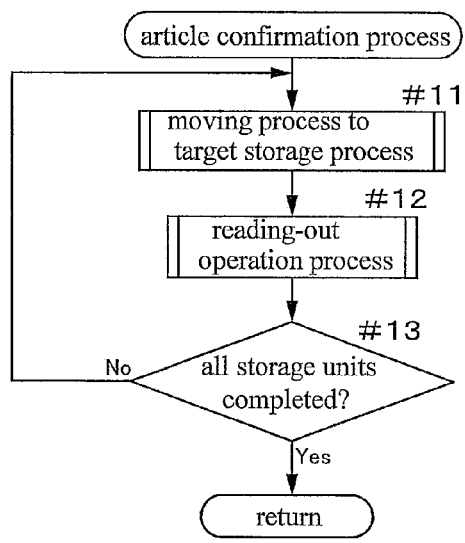
FIG. 12 is a flowchart showing another control operation.

As shown in FIG. 12, in the article confirmation process, a moving step (#11) for moving the transfer means R to the target storage units, that is, all the storage units S provided in the storage shelves 1, and the reading-out operation step (#12) are repeated until the article confirmation relative to all the storage units S of the storage shelves 1 is completed (#13).

The moving step (#11) executed on the target storage units is for moving the transfer means R to the target storage units to be confirmed that are determined based on predetermined order information on the plurality of the storage units S. More particularly, the transfer means R is moved to the predetermined transfer position in the transverse direction relative to the target storage unit S and the article supporting member 8 is positioned at the fetching level B1.

Figure 13:
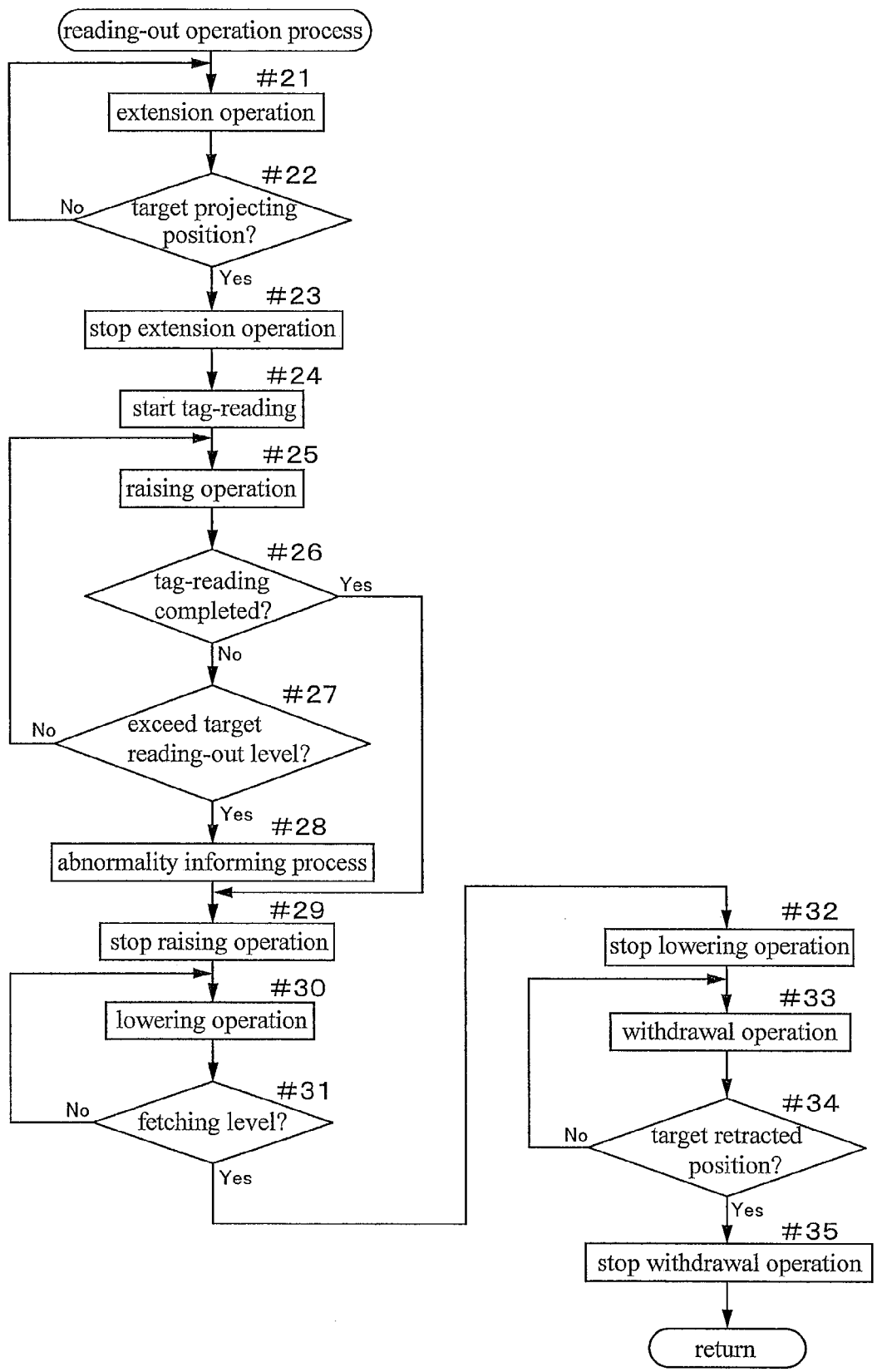
FIG. 13 is a flowchart showing a further control operation.

FIG. 13 is the flowchart of the reading-out operation process.

As shown in FIG. 13, when the execution of the article confirmation process for reading out the identification information of the tag T provided in the container U stored in the storage unit S by the RFID reader D is instructed, the control section H performs an extension process for extending the article supporting member 8 to the projecting position at the fetching level. More particularly, the control section H starts an extending operation to extend the article supporting member 8 (#21), and suspends the extending operation of the article supporting member 8 (#23) when it is determined that the current position of the article supporting member 8 is at a target projecting position corresponding to the above-noted projecting position (#22).

Next, the control section H is configured to raise the article supporting member 8 to the target reading-out level higher than the fetching level by the raised amount for reading, subsequent to the above extending process, and perform a raising process for staring to read out the identification information of the RFID tag T by the RFID reader D. More particularly, the control section H starts the reader D reading out the identification information of the tag T (#24), and then starts the raising operation of the article supporting member 8.

Here, if the reading of the identification information of the RFID tag T by the RFID reader D is started in the course of the raising operation and the reading of the identification information of the RFID tag T by the RFID reader D is completed in the course of raising the article supporting member 8 to the target reading-out level from the fetching level in the above raising process, the control section H stops raising the article supporting member 8 and performs a lowering process described later. More particularly, the control section H stops the raising operation of the article supporting member 8 (#29) when the reading of the identification information of the tag T by the reader D is completed (#26), or when the level of the article supporting member 8 exceeds the target reading-out level B3.

Further, the control section H performs an abnormality informing step for outputting information on an abnormal situation when the level of the article supporting member 8 exceeds the target reading-out level B3 without the reader D reading out the identification information of the tag T (#28).

The control section H performs the lowering process subsequent to the above-noted raising process for lowering the article supporting member 8 to the fetching level. More particularly, the control section H starts the lowering operation of the article supporting member 8 (#30) after stopping the raising operation of the article supporting member 8 at step #29, and then stops the lowering operation of the article supporting member 8 (#32) when the level of the article supporting member 8 is lowered to the fetching level B1 (#31).

Next, the control section H performs a withdrawing process subsequent to the above-noted lowering process for withdrawing the article supporting member 8 to the retracted position at the fetching level. More particularly, the control section H starts a withdrawing operation of the article supporting member 8 (#33), and suspends the withdrawing operation of the article supporting member 8 (#35) when it is determined that the article supporting member 8 is at a target retracted position corresponding to the retracted position (#34).

Modified Embodiments (1) In the above embodiment, the cutout portion is formed in the plate-like member for receiving the container forming the storage unit to continue from the opening W for receiving the article supporting member and to be depressed toward the side of the RFID tag with the article storage container being placed on the storage unit. Alternatively, the cutout portion is dispensable.

More particularly, even if any cutout portion is formed, it is possible to read out the identification information of the RFID tag by the RFID reader without being affected by the plate-like member for receiving the container only if the article storage container is designed to be sufficiently raised from the plate-like member for receiving the container.

(2) In the above embodiment, the reading-out operation by the RFID reader is started before the raising operation of the article supporting member is started in the reading-out operation process. Instead, the reading-out operation by the RFID reader may be started after the raising operation of the article supporting member is started. The point is that the reading-out operation of the RFID reader is started while the article supporting member is raised from the fetching level to the target reading-out level. Alternatively, it is also possible to start the reading-out operation of the RFID reader after the article supporting member is raised to the target reading-out level in order to save energy consumed by the reading-out operation of the RFID reader, for example.

(3) In the above embodiment, the FOUP is used as the article storage container. Instead, various types of article storage containers including a bucket or any other containers may be used to carry out the present invention.

(4) In the above embodiment, the RFID reader is attached to the top surface of the distal end portion of the article supporting member. Instead, the RFID may be attached to any other positions of the article supporting member depending on the attaching position of the RFID tag relative to the article storage container and the shape of the plate-like member for receiving the container.

(5) In the above embodiment, the transfer means is provided in the stacker crane. Instead, the present invention may be applied to article storage equipment in which the transfer means may be movable in the width direction of the storage section along the guide rail extending over the length of the width direction of the storage section to be vertically movable in the front side of the storage section including the storage units arranged vertically and horizontally.

(6) In the above embodiment, the storage units are arranged vertically and horizontally. Instead, the present invention may be applied to the storage section including the storage units arranged only in the horizontal direction or to the storage section including the storage units arranged only in the vertical direction.

In an example of the storage section including the storage units arranged only in the horizontal direction, the storage units are arranged along with a longitudinal direction of and in a lateral portion of a running path of what is called a hoist-type conveying carriage that runs suspended from a traveling rail provided at the ceiling. In that case, the transfer means having the extendable/retractable article supporting member is provided in the hoist-type conveying carriage.

INDUSTRIAL USABILITY

Article storage equipment and a method of operating the same according to the present invention may be used for performing an article confirmation process appropriately and cut down the time required for such a process at the same time.

The invention claimed is:
1. An article storage equipment comprising:
a storage section including a plurality of arranged storage units each for supporting and receiving an article storage container;
conveying means movable in a direction of arranging the storage units within an article transporting space defined in a front side of the storage section and having transfer means operable to transfer the article storage container to the storage units; and
control means for controlling operation of the conveying means,
the transfer means having an article supporting member movable between a retracted position in the article transporting space and a projecting position to project into each of the storage units and also vertically movable for receiving the article storage container, the article supporting member being used in a fetching process for taking out the article storage container placed on any of the storage units and in a storing process for storing the article storage container placed on the article supporting member in any of the storage units;

the storage units each having a plate-like member made of metal for receiving the article storage container to be stored, the plate-like member having an opening through which the article supporting member in the projecting position vertically passes, the control means being configured to control the operation of the conveying means to extend the article supporting member to the projecting position at a fetching level lower than the plate-like member of the storage unit by a fixed amount, raise the article supporting member to a target fetching level higher than the fetching level by a raised amount for fetching, and then withdraw the article supporting member to the retracted position when the fetching process is performed, wherein the article storage container has a passive-type RFID tag storing identification information of the article storage container and provided in a portion of an outer periphery of the article storage container overlapping above the plate-like member with the article storage container being placed on the storage unit, the article supporting member has an RFID reader for reading out the identification information stored in the RFID tag, and the control means is configured to perform a reading-out operation process for controlling the operation of the conveying means when execution of an article confirmation process for allowing the RFID reader to read out the identification information of the RFID tag provided in the article storage container stored in the storage unit is instructed to extend the article supporting member to the projecting position at the fetching level, raise the article supporting member to a target reading-out level higher than the fetching level by a raised amount for reading, and then lower the article supporting member to the fetching level to be withdrawn to the retracted position.

2. The article storage equipment as claimed in claim 1, wherein the raised amount for reading is determined to be smaller than the raised amount for fetching.

3. The article storage equipment as claimed in claim 2, wherein the opening formed in the plate-like member has a shape along an outer peripheral contour of an end portion of the article supporting member in the projecting position, and wherein a cutout portion is formed in the plate-like member to continue from the opening and to be depressed toward the side of the RFID tag with the article storage container being placed on the storage unit.

4. The article storage equipment as claimed in claim 1, wherein, in the reading-out operation process, the control means is configured to start the reader reading out of the identification information of the RFID tag when allowing the article supporting member to extend to the projecting position at the fetching level and then to be raised to the target reading-out level from the fetching level, and suspend the rising movement of the article supporting member to allow the article supporting member to be lowered to the fetching level and withdrawn to the retracted position when the reading-out of the identification information of the RFID tag by the RFID reader is completed in the course of raising the article supporting member from the fetching level to the target reading-out level.

5. The article storage equipment as claimed in claim 2, wherein, in the reading-out operation process, the control means is configured to start the reader reading out of the identification information of the RFID tag when allowing the article supporting member to extend to the projecting position at the fetching level and then to be raised to the target reading-out level from the fetching level, and suspend the rising movement of the article supporting member to allow the article supporting member to be lowered to the fetching level and withdrawn to the retracted position when the reading-out of the identification information of the RFID tag by the RFID reader is completed in the course of raising the article supporting member from the fetching level to the target reading-out level.

6. The article storage equipment as claimed in claim 3, wherein, in the reading-out operation process, the control means is configured to start the reader reading out of the identification information of the RFID tag when allowing the article supporting member to extend to the projecting position at the fetching level and then to be raised to the target reading-out level from the fetching level, and suspend the rising movement of the article supporting member to allow the article supporting member to be lowered to the fetching level and withdrawn to the retracted position when the reading-out of the identification information of the RFID tag by the RFID reader is completed in the course of raising the article supporting member from the fetching level to the target reading-out level.

7. The article storage equipment as claimed in claim 1, wherein the article storage container is an FOUP for accommodating a substrate and the RFID tag is provided in a portion corresponding to a rear side of the FOUP with the FOUP being placed on the article supporting member, and wherein the plate-like member is provided with an upright positioning pin for engaging with a positioning recess formed in a bottom portion of the FOUP.

8. The article storage equipment as claimed in claim 2, wherein the article storage container is an FOUP for accommodating a substrate and the RFID tag is provided in a portion corresponding to a rear side of the FOUP with the FOUP being placed on the article supporting member, and wherein the plate-like member is provided with an upright positioning pin for engaging with a positioning recess formed in a bottom portion of the FOUP.

9. The article storage equipment as claimed in claim 3, wherein the article storage container is an FOUP for accommodating a substrate and the RFID tag is provided in a portion corresponding to a rear side of the FOUP with the FOUP being placed on the article supporting member, and wherein the plate-like member is provided with an upright positioning pin for engaging with a positioning recess formed in a bottom portion of the FOUP.

10. The article storage equipment as claimed in claim 4, wherein the article storage container is an FOUP for accommodating a substrate and the RFID tag is provided in a portion corresponding to a rear side of the FOUP with the FOUP being placed on the article supporting member, and wherein the plate-like member is provided with an upright positioning pin for engaging with a positioning recess formed in a bottom portion of the FOUP.

11. The article storage equipment as claimed in claim 5, wherein the article storage container is an FOUP for accommodating a substrate and the RFID tag is provided in a portion corresponding to a rear side of the FOUP with the FOUP being placed on the article supporting member, and wherein the plate-like member is provided with an upright positioning pin for engaging with a positioning recess formed in a bottom portion of the FOUP.

12. The article storage equipment as claimed in claim 6, wherein the article storage container is an FOUP for accommodating a substrate and the RFID tag is provided in a portion corresponding to a rear side of the FOUP with the FOUP being placed on the article supporting member, and wherein the plate-like member is provided with an upright positioning pin for engaging with a positioning recess formed in a bottom portion of the FOUP.

13. A method of operating article storage equipment including:

a storage section including a plurality of arranged storage units each for supporting and receiving an article storage container;

conveying means movable in a direction of arranging the storage units within an article transporting space defined in a front side of the storage section and having transfer means operable to transfer the article storage container to the storage units; and control means for controlling operation of the conveying means, the transfer means having an article supporting member movable between a retracted position in the article transporting space and a projecting position to project into each of the storage units and also vertically movable for receiving the article storage container, the article supporting member being used in a fetching process for taking out the article storage container placed on any of the storage units and in a storing process for storing the article storage container placed on the article supporting member in any of the storage units;

the storage units each having a plate-like member made of metal for receiving the article storage container to be stored, the plate-like member having an opening through which the article supporting member in the projecting position vertically passes, the control means being configured to control the operation of the conveying means to extend the article supporting member to the projecting position at a fetching level lower than the plate-like member of the storage unit by a fixed amount, raise the article supporting member to a target fetching level higher than the fetching level by a raised amount for fetching, and then withdraw the article supporting member to the retracted position when the fetching process is performed, wherein the article storage container has a passive-type RFID tag storing identification information of the article storage container and provided in a portion of an outer periphery of the article storage container overlapping above the plate-like member with the article storage container being placed on the storage unit, the article supporting member has an RFID reader for reading out the identification information stored in the RFID tag, wherein the method of operating the article storage equipment comprising the steps of:

an extending step for extending the article supporting member to the projecting position at the fetching level when execution of an article confirmation process for allowing the RFID reader to read out the identification information of the RFID tag provided in the article storage container stored in the storage unit is instructed;

a raising step for raising the article supporting member to a target reading-out level higher than the fetching level by a raised amount for reading and for staring the RFID reader reading out the identification information of the RFID tag;

a lowering step for lowering the article supporting member to the fetching level subsequent to the raising step; and a withdrawing step for withdrawing the article supporting member to the retracted position at the fetching level.

14. The method of operating article storage equipment as claimed in claim 13, wherein, in the raising step, when reading out of the identification information of the RFID tag by the RFID reader is started and when the reading-out of the identification information by the reader D is completed in the course of raising the article supporting member from the fetching level to the target reading-out level, the raising movement of the article supporting member is suspended to shift to the lowering step.

* * * * *

UNITED STATES PATENT AND TRADEMARK OFFICE
CERTIFICATE OF CORRECTION

| | | |
|---|---|---|
| PATENT NO. | : 8,928,481 B2 | Page 1 of 1 |
| APPLICATION NO. | : 13/513772 | |
| DATED | : January 6, 2015 | |
| INVENTOR(S) | : Takeshi Abe | |

It is certified that error appears in the above-identified patent and that said Letters Patent is hereby corrected as shown below:

In the Claims

Column 24, Line 21, Claim 13, delete "staring" and insert -- starting --

Signed and Sealed this
Twenty-eighth Day of April, 2015

Michelle K. Lee
*Director of the United States Patent and Trademark Office*